(Model.)
G. F. LARKIN.
Hat Block and Chuck.
No. 236,897. Patented Jan. 25, 1881.
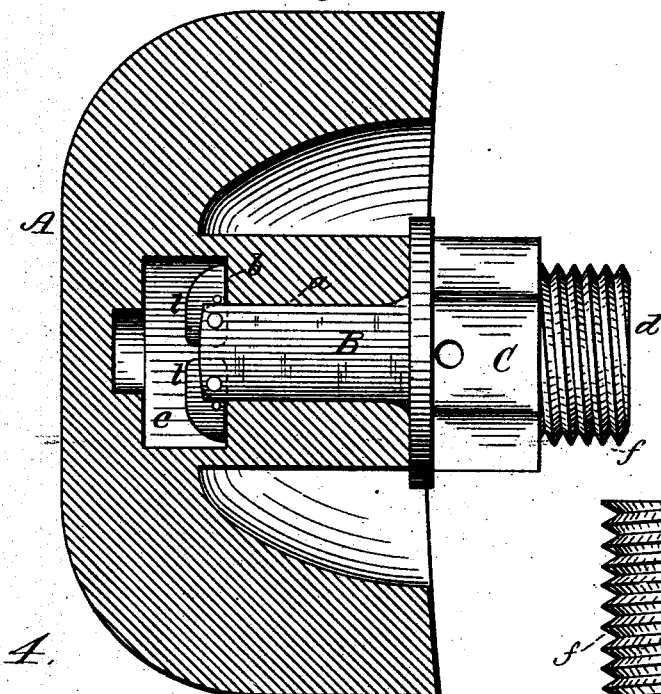
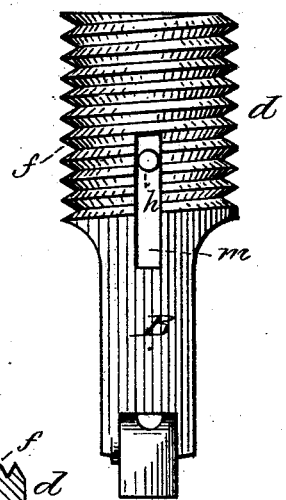
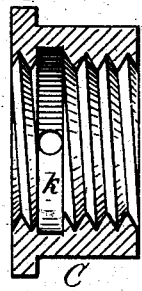
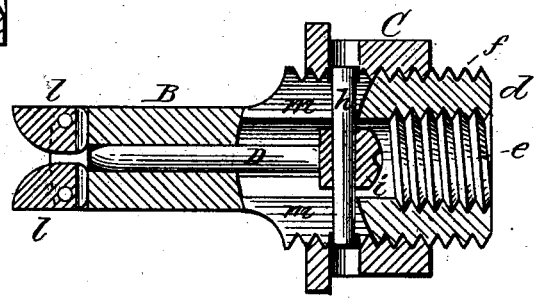
Witnesses
Nat. E. Oliphant,
Geo. R. Porter.
Inventor
George F. Larkin,
per Chas. H. Fowler.
Attorney.

UNITED STATES PATENT OFFICE.

GEORGE F. LARKIN, OF DANBURY, CONNECTICUT.

HAT BLOCK AND CHUCK.

SPECIFICATION forming part of Letters Patent No. 236,897, dated January 25, 1881.

Application filed June 28, 1880. (Model.)

*To all whom it may concern:*

Be it known that I, GEORGE F. LARKIN, a citizen of the United States, residing at Danbury, in the county of Fairfield and State of Connecticut, have invented certain new and useful Improvements in Hat Blocks and Chucks; and I do hereby declare that the following is a full, clear, and exact description of the same, reference being had to the annexed drawings, making a part of this specification, and to the letters and figures of reference marked thereon.

Figure 1 of the drawings is a side elevation of the chuck, with the hat-block in section. Fig. 2 is a sectional view of the chuck; Fig. 3, a plan view of the same, with the operating screw-nut removed; and Fig. 4, a sectional view of the nut.

The present invention has relation to certain new and useful improvements in hat blocks and chucks; and it consists in the special form of the block and chuck whereby the two are firmly and securely connected together in a simple and effective manner, and also disconnected from each other, when required. These results I obtain by the construction and mechanism illustrated in the drawings and hereinafter described.

In the accompanying drawings, A represents a hat-block which may be varied in form to meet special requirements, and has axial opening $a$, shoulder $b$, and chamber $c$ for connecting it to the chuck.

The chuck B has a head, $d$, with interior screw-threads $e$ for connecting it to the spindle, and exterior screw-threads $f$ for the reception of a screw-nut, C, which operates the chuck in securing or releasing it from the hat-block. The chuck B has a central axial opening for the reception of a plunger, D, a pin, $h$, passing through the head $i$ of said plunger, and its projecting ends entering a circumferential groove, $k$, in the interior face of the nut C. Two claws, $l$, are pivoted to the end of the chuck B, and are operated upon by the end of the plunger D in the following manner:

When it is desired to connect the chuck to the hat-block, the claws $l$ and plunger D are in the position as illustrated in Fig. 1, and the end of the chuck passed into the opening $a$ and into the chamber $c$. The screw-nut C is now screwed down in the direction of the claws $l$, which carries the pin $h$ along the recesses $m$, and causes the end of the plunger D to strike against the rear ends of the claws, forcing them out laterally against the shoulder, and thus holding the chuck to the block, the chamber $c$ giving sufficient room for the claws to close or open, as the case may be.

Having now fully described my invention, what I claim as new, and desire to secure by Letters Patent, is—

1. The hat-block A, having axial opening $a$, shoulder $b$, and chamber $c$, in combination with the chuck B, provided with pivoted claws $l$, and means for operating them, substantially as and for the purpose set forth.

2. The chuck A, for holding hat-blocks, provided with the pivoted claws $l$, screw-threaded head $d$, and recesses $m$, in combination with the plunger D, pin $h$, and screw-threaded nut C, substantially as and for the purpose set forth.

In testimony that I claim the above I have hereunto subscribed my name in the presence of two witnesses.

GEORGE F. LARKIN.

Witnesses:
JOSEPH NUTT,
DAVID B. BOOTH.